United States Patent
Lee et al.

(10) Patent No.: US 8,904,218 B2
(45) Date of Patent: *Dec. 2, 2014

(54) PORTABLE DEVICE AND METHOD FOR PROVIDING VOICE RECOGNITION SERVICE

(71) Applicant: LG Electronics Inc., Seoul (KR)

(72) Inventors: Kiwon Lee, Seoul (KR); Suyoung Lee, Seoul (KR); Hokyuong Ka, Seoul (KR); Youngwoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/203,119

(22) Filed: Mar. 10, 2014

(65) Prior Publication Data

US 2014/0195841 A1   Jul. 10, 2014

Related U.S. Application Data

(63) Continuation of application No. 13/840,926, filed on Mar. 15, 2013, now Pat. No. 8,843,173.

(60) Provisional application No. 61/732,415, filed on Dec. 3, 2012.

(30) Foreign Application Priority Data

Feb. 5, 2013   (KR) .......................... 10-2013-0013052

(51) Int. Cl.
*G06F 1/32*   (2006.01)
*G06F 3/041*  (2006.01)
*H04W 52/02*  (2009.01)

(52) U.S. Cl.
CPC ......... *G06F 1/3206* (2013.01); *H04W 52/0254* (2013.01); *H04M 2250/12* (2013.01); *H04M 2250/74* (2013.01)
USPC ........... 713/323; 713/320; 713/324; 345/173; 345/174

(58) Field of Classification Search
USPC .................... 345/173, 174; 713/320, 323, 324
See application file for complete search history.

(56) References Cited

U.S. PATENT DOCUMENTS

| | | | |
|---|---|---|---|
| 7,567,827 B2 | 7/2009 | Kim | |
| 8,234,512 B2 | 7/2012 | Mucignat et al. | |
| 8,706,172 B2 * | 4/2014 | Priyantha et al. | 455/574 |
| 2006/0211499 A1 | 9/2006 | Bengtsson et al. | |

(Continued)

FOREIGN PATENT DOCUMENTS

EP   2 317 744 A1   5/2011

*Primary Examiner* — Vincent Tran
(74) *Attorney, Agent, or Firm* — Birch, Stewart, Kolasch & Birch, LLP

(57) ABSTRACT

A portable device and a method for controlling the device are disclosed. The portable device includes sensors configured to sense user inputs; a sensor hub configured to activate a main processor and control the sensors including a touch sensor, the touch sensor sensing touch inputs while the portable device is in a standby mode; and the main processor configured to execute an application and control the portable device, wherein, when the portable device is in the standby mode, the touch sensor is in an active state and at least one of the sensors except the touch sensor is in an inactive state, and when the touch sensor detects a first touch input which corresponds to a pre-stored pattern, the sensor hub activates the main processor and switches the portable device from the standby mode to an active mode.

20 Claims, 14 Drawing Sheets

(56) References Cited

U.S. PATENT DOCUMENTS

| | | |
|---|---|---|
| 2009/0284463 A1 | 11/2009 | Morimoto et al. |
| 2010/0134437 A1* | 6/2010 | Yang et al. .................... 345/174 |
| 2010/0182270 A1* | 7/2010 | Caliskan et al. ............. 345/174 |
| 2011/0077865 A1 | 3/2011 | Chen et al. |
| 2011/0237230 A1 | 9/2011 | Li et al. |
| 2012/0249431 A1* | 10/2012 | Li ................................ 345/173 |
| 2012/0254878 A1 | 10/2012 | Nachman et al. |
| 2012/0280917 A1 | 11/2012 | Toksvig et al. |
| 2013/0194223 A1* | 8/2013 | Ward et al. .................... 345/174 |
| 2014/0075178 A1* | 3/2014 | Trethewey .................... 713/100 |

* cited by examiner (a)

(b)

(c)

PORTABLE DEVICE AND METHOD FOR PROVIDING VOICE RECOGNITION SERVICE

CROSS-REFERENCE TO RELATED APPLICATIONS

This application is a continuation of co-pending U.S. patent application Ser. No. 13/840,926 filed on Mar. 15, 2013, which claims the benefit of U.S. Provisional Application No. 61/732,415 filed on Dec. 3, 2012 and Korean Patent Application No. 10-2013-0013052 filed on Feb. 5, 2013, the entire contents of all of the above applications are hereby incorporated by reference.

BACKGROUND OF THE DISCLOSURE

1. Field of the Disclosure

The disclosure relates to a portable device, and more particularly, to a method for providing a voice recognition service by switching a portable device from standby mode to voice recognition service mode using a sensor.

2. Discussion of the Related Art

Along with the miniaturization of chip sets and the development of network technology, portable devices have ever increasing performance and diversified functions. Recently, the portable devices have evolved from traditional communication equipment to smart devices capable of providing various services to users. A portable device can even play the role of a personal assistant and this function is often called as an intelligent agent. Further, the portable device can provide optimized functions according to a user context using various sensors equipped in it.

SUMMARY OF THE DISCLOSURE

As portable devices get smaller, the battery capacity of the portable devices is limited in view of their sizes. In this context, power management is a very significant issue to the portable devices. Accordingly, there exists a need for minimizing power consumption according to a service provided by a portable device. In addition, it is necessary for the portable device to provide various services more readily according to a user's intention by means of sensors.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a portable device includes a mechanical vibration sensor configured to sense vibrations having a magnitude equal to or larger than a threshold and generate an electrical signal, a motion sensor configured to sense a motion of the portable device, an audio sensor configured to receive a voice command, a sensor hub configured to control a plurality of sensors including the motion sensor and the audio sensor, and a main processor configured to execute an application and control the portable device. When the portable device is placed in standby mode, upon receipt of the electrical signal from the mechanical vibration sensor, the sensor hub is configured to switch from inactive state to active state and activate the motion sensor, and if a gesture pattern sensed through the motion sensor corresponds to a voice recognition service triggering gesture, the sensor hub is configured to switch the portable device to voice recognition service mode by activating the main processor.

In another aspect of the disclosure, a method for providing a voice recognition service in a portable device includes activating a sensor hub by transmitting an electrical signal to the sensor hub, upon sensing vibrations having a magnitude equal to or larger than a threshold by a mechanical vibration sensor, activating a motion sensor connected to the sensor hub by the sensor hub, activating a main processor by the sensor hub, if a gesture pattern sensed by the motion sensor matches a voice recognition service triggering gesture, and switching the portable device from standby mode to voice recognition service mode by the main processor.

It is to be understood that both the foregoing general description and the following detailed description of the disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Although the terms used in the disclosure are selected from generally known and used terms, the terms may be changed according to the intention of an operator, customs, or the advent of new technology. Some of the terms mentioned in the disclosure have been selected by the applicant at his or her discretion, the detailed meanings of which are described in relevant parts of the description herein. Therefore, the disclosure must be understood, not simply by the actual terms used but by the meanings of each term lying within.

The disclosure relates to a portable device. The portable device refers to an electronic device that can be carried with a user. In some embodiments, the term 'portable device' covers a broad range of electronic devices including a portable phone, a tablet PC, a phablet, a laptop computer, a Personal Digital Assistant (PDA), etc. A description will first be given of the portable device.

Figure 1:
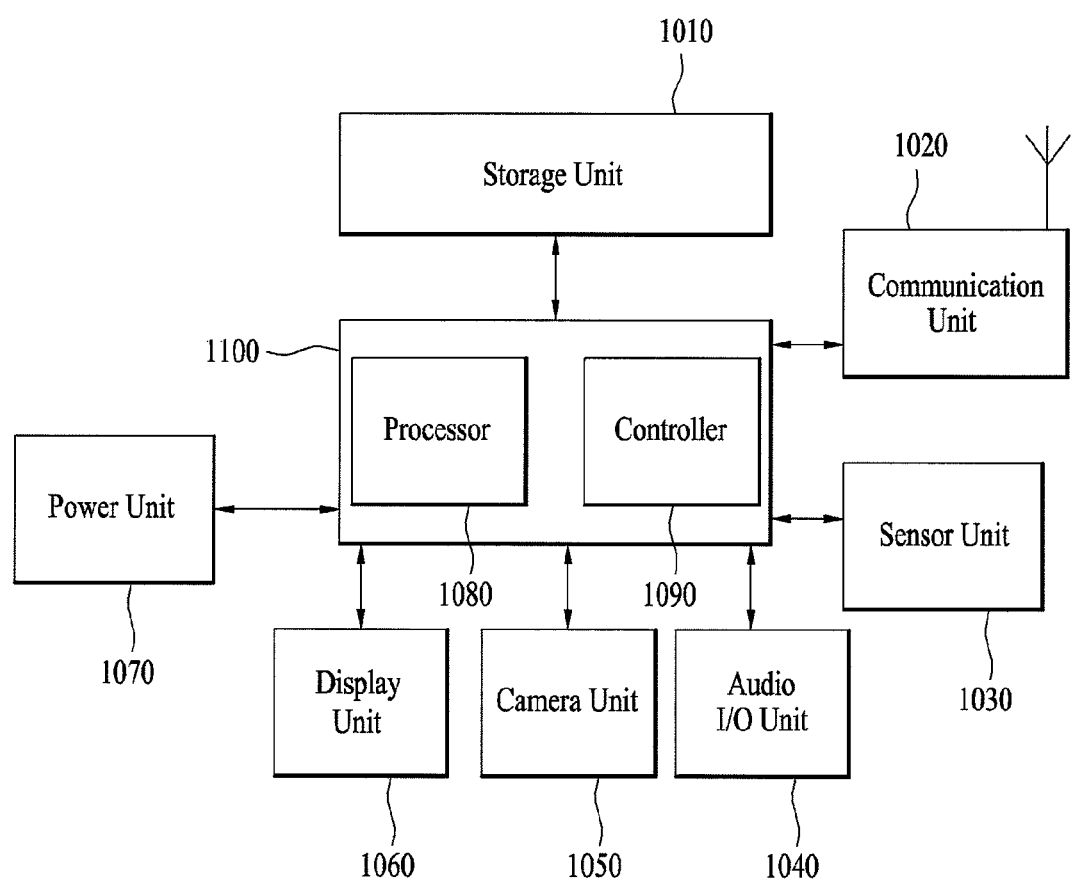
FIG. 1 is a block diagram of a portable device according to an embodiment.

FIG. 1 is a block diagram of a portable device according to an embodiment.

In the embodiment of FIG. 1, the portable device includes a storage unit 1010, a communication unit 1020, a sensor unit 1030, an audio Input/Output (I/O) unit 1040, a camera unit 1050, a display unit 1060, a power unit 1070, a processor 1080, and a controller 1090.

The portable device illustrated in FIG. 1 is purely exemplary and thus all of the units illustrated in FIG. 1 are not necessarily provided in the portable device. Configurations required for operations of the portable device will be described later according to embodiments.

The storage unit 1010 may store various digital data such as a video, an audio, pictures, applications, etc. The storage unit 1010 refers to a digital data storage space such as a flash memory, a Hard Disk Drive (HDD), a Solid State Drive (SSD), etc.

The communication unit 1020 may transmit data to or receive data from the outside of the portable device by using various communication protocols. The communication unit 1020 may be connected to an external network wirelessly or by wire and thus transmit or receive digital or analog data to or from the external network.

The sensor unit 1030 may recognize a user input or a device environment by using a plurality of sensors equipped in the portable device and provide the recognized result to the controller 1090. The sensor unit 1030 may include a plurality of sensing means. In an embodiment, the plurality of sensing means may include a gravity sensor, a geomagnetic sensor, a gyro sensor, an acceleration sensor, an inclination sensor, an illuminance sensor, an altitude sensor, an odor sensor, a temperature sensor, a depth sensor, a pressure sensor, a bending sensor, an audio sensor, a video sensor, a Global Positioning System (GPS) sensor, a touch sensor, a mechanical vibration sensor, etc. The sensor unit 1030 generically refers to such various sensing means. The sensor unit 1030 may sense various user inputs and user environments and provide sensing results so that the portable device may perform operations corresponding to the sensing results. The above-described sensors may be included as separate elements or may be incorporated into one or more elements in the portable device.

In an embodiment, the sensor unit 1030 may include a sensor hub and a plurality of sensing means. The sensor hub may control the plurality of sensing means connected to the sensor hub, receive sensing values from the plurality of sensing means, and provide the received sensing values to a main processor. The sensor hub may a medium between the plurality of sensing means and the main processor. From the perspective of hardware, the sensor hub may be incorporated into the main processor or may be configured separately. The operation of the sensor hub will be described later.

The audio I/O unit 1040 may include audio output means such as a speaker and audio input means such as a microphone and thus may be responsible for audio input and output of the portable device. The audio input unit 1040 may be used as an audio sensor or a speech sensor, like a microphone. The audio output unit 1040 may be used as a speaker for outputting voice or sound.

The camera unit 1050 may capture a picture and a video. In some embodiments, the camera unit 1050 is optional. The camera unit 1050 may be used as the afore-mentioned motion sensor or the afore-mentioned visual sensor.

The display unit 1060 may display an image on a display screen. If the display is a touch sensitive display, the display unit 1060 may be used as the afore-mentioned touch sensor. The display unit 1060 may display an image on the display screen or may control image displaying. If the portable device is not provided with a display screen, the display unit 1060 may be optional.

The power unit 1070 is a power source connectable to an internal battery in the portable device or an external power source, for supplying power to the portable device.

The processor 1080 may execute various applications stored in the storage unit 1010 and process data in the portable device. The controller 1090 may control the above-described units of the portable device and manage data transmission and reception between the units and their operations. The processor 1080 and the controller 1090 may be implemented on a single chip and perform the above operations in conjunction with each other. In this case, the processor 1080 and the controller 1090 may collectively be referred to as a main processor 1100, hereinbelow.

In an embodiment, the main processor 1100 is capable of recognizing voice. The main processor 1100 may recognize the voice of a user received through the audio input unit 1040 and operate in accordance with the recognized user's voice. The main processor 1100 may perform a natural language process on a voice command received from the user, which will be detailed later.

In FIG. 1, which is a block diagram of the portable device according to the embodiment, separately shown blocks are logically distinguished elements of the portable device. Therefore, these elements may be incorporated into one chip or configured on a plurality of chips according to the design of the portable device. The portable device illustrated in FIG. 1 is simply an embodiment, which implies that all elements of FIG. 1 are not necessary to implement embodiments of the disclosure. Elements and their operations required to implement embodiments of the disclosure will be described below.

Because the portable device is equipped with a power unit having a limited capacity, power management is crucial to lengthen the use time of the portable device. The power consumption of the portable device may be managed according to its operation modes. Now a description will be given below of the operation modes of the portable device in regard to power management.

Figure 2:
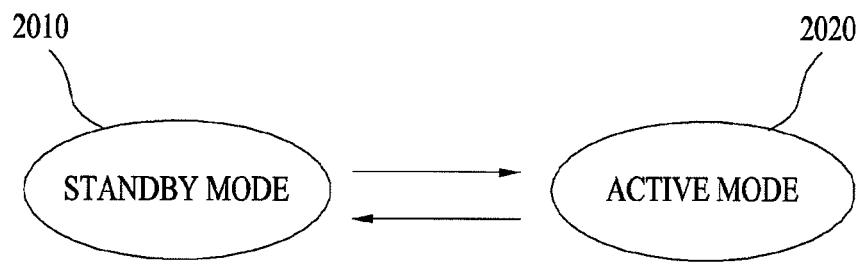
FIG. 2 is a diagram illustrating operation modes of the portable device according to an embodiment.

FIG. 2 is a diagram illustrating the operation modes of the portable device according to an embodiment.

Referring to FIG. 2, the portable device may operate in standby mode 2010 and active mode 2020. In the active mode 2020, most of the elements of the portable device operate in active state and all functions of the portable device are available to the user. In the standby mode 2010, some elements of the portable device are in the active state, while other elements are in inactive state. In the disclosure, the active state is a state in which an element is operating, consuming power, and the inactive state is a state in which an element does not consume power or stands by with low power consumption. For example, an inactive-state element does not operate, cannot transmit or receive data, or is capable of data transmission and reception only.

In the absence of a user input for a predetermined time or longer or upon receipt of a specific user input, the portable device may switch from the active mode 2020 to the standby mode 2010. On the other hand, upon sensing a specific user input or upon occurrence of a specific event, the portable device may switch from the standby mode 2010 to the active mode 2020. In an embodiment, the portable device may minimize power consumption in the standby mode 2010 by placing elements such as the display, at least one sensor, the main processor, etc. in the inactive state. However, elements required for the portable device to switch from the standby mode 2010 to the active mode 2020 should stay in the active state.

When the portable device is in the active mode 2020, the portable device may provide various functions. In an embodiment, the portable device may provide a voice recognition service. The voice recognition service refers to a service of recognizing a user's voice command by voice recognition technology, performing an operation corresponding to the recognized voice command, and providing the result of the operation according to the disclosure. Although the portable device may provide the voice recognition service in the active mode 2020, the portable device may not need to place all elements in the active state, for the voice recognition service. For example, even though the touch sensor is placed in the inactive state, the voice recognition service is available by the portable device. If the voice recognition service provides information other than visual information, the portable device may deactivate the display unit, thereby reducing power consumption. Considering that the voice recognition service can be used often as a personal assistant function or an intelligent agent, the portable device may be designed in such a manner that it can switch from the standby mode directly to voice recognition service mode, as described below.

Figure 3:
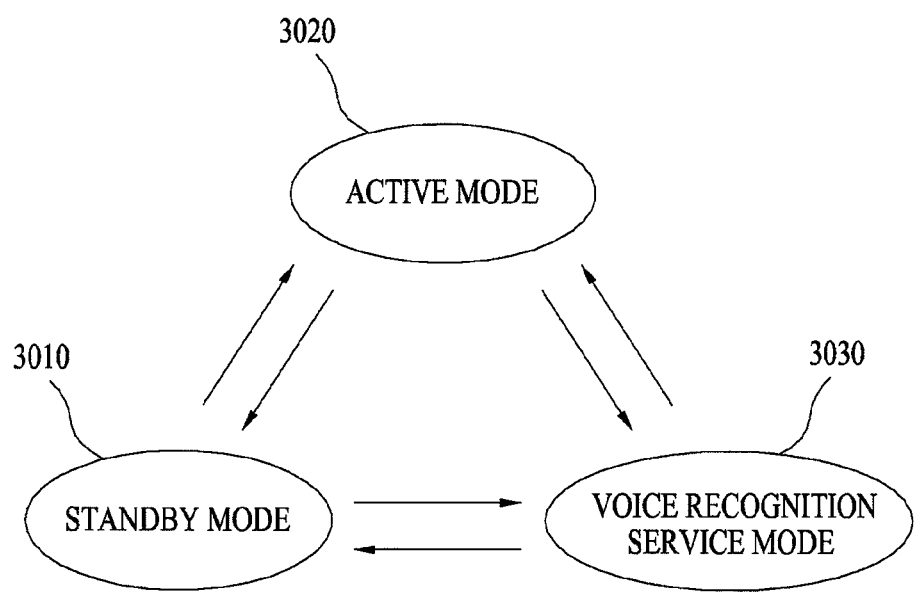
FIG. 3 is a diagram illustrating operation modes of the portable device according to an embodiment.

FIG. 3 is a diagram illustrating the operation modes of the portable device according to an embodiment.

In the embodiment illustrated in FIG. 3, the portable device may operate in standby mode 3010, active mode 3020, and voice recognition service mode 3030. The standby mode 3010 and the active mode 3020 have been described before with reference to FIG. 2. The voice recognition service mode 3030 is a mode in which only elements needed to provide the voice recognition service are placed in the active state. For example, the main processor, the communication unit, and the audio I/O unit may be in the active state. When needed, the display unit may further be placed in the active state. Hereinbelow, the voice recognition service mode 3030 may be referred to shortly as voice service mode. If the portable device is set in the active mode 3020, the portable device may enter the voice service mode 3030 through various user inputs. In this case, the voice service mode 3030 may be similar to provisioning of the voice recognition service in the active mode described before with reference to FIG. 2. However, if the portable device is in the standby mode 3010, the portable device may switch to the active mode 3020 or the voice service mode 3030. The switching to the active mode 3020 or the voice service mode 3030 may be referred to as the activation of the portable device.

When the portable device is in the standby mode 3010, the portable device may directly switch from the standby mode 3010 to the voice service mode 3030, upon receipt of a specific input for entering the voice service mode 3030. The specific input may be, for example, a gesture, a voice command, etc. issued for the portable device. When a specific input for switching from the standby mode 3010 to the voice service mode 3030 is a gesture to the portable device, the gesture may be referred to as a voice recognition service triggering gesture. Hereinbelow, the voice recognition service triggering gesture may be referred to shortly as a voice service triggering gesture.

When the portable device directly switches from the standby mode 3010 to the voice service mode 3030, fewer elements may operate in the portable device than in providing the voice recognition service in the active mode 3020. For example, the portable device may just activate the other elements except for the touch sensor, the display unit, etc. according to the state of the portable device in the standby mode 3010, to thereby enter the voice service mode 3030. Inconvenience with which the portable device is activated and then a voice recognition service function is invoked can be relieved on the part of the user because the portable device can directly enter the voice service mode 3030 from the standby mode 3010. Furthermore, if only the voice recognition service is used, the portable device uses fewer elements than in the active mode 3020, thereby reducing power consumption compared to the active mode.

Methods for activating a standby-mode portable device to the active mode or the voice service mode will be described below. As described before, a standby-mode portable device may be activated by means of a specific user input. Accordingly, the portable device should maintain elements required for recognizing the specific user input and reacting to the user input in the active state. A description will be given of configurations of elements required to recognize a voice service triggering gesture in the portable device and methods for entering the voice service mode using the elements.

Figure 4:
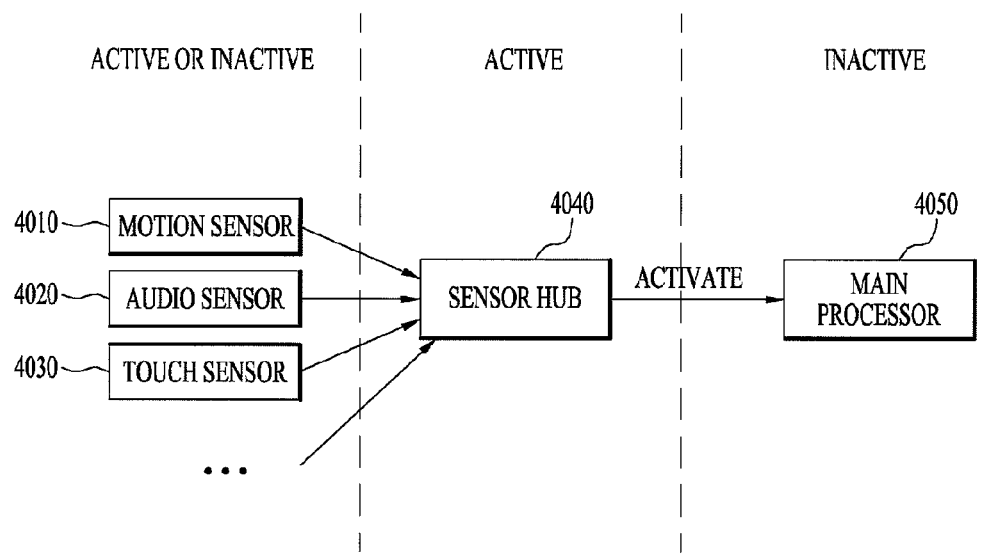
FIG. 4 illustrates a standby-mode portable device and a method for activating the standby-mode portable device according to an embodiment.

FIG. 4 illustrates a standby-mode portable device and a method for activating the standby-mode portable device according to an embodiment.

The standby-mode portable device may maintain elements including a main processor 4050, a display unit, etc. in the inactive state. One thing to note herein is that to switch from the standby mode to the active mode as triggered by a specific user input, the portable device should set at least one of sensors 4010, 4020 and 4030 and a sensor hub 4040 in the active state in order to recognize the specific user input.

In FIG. 4, at least one of the motion sensor 4010, the audio sensor 4020, and the touch sensor 4030 is placed in the active state, for sensing a specific user input to the portable device. Upon receipt of the sensing result of the specific user input from the at least one sensor, the sensor hub 4040 determines whether the sensing result matches a user input preset to activate the portable device. If the sensing result does not match the preset user input, the sensor hub 4040 does not activate the main processor 4050. On the contrary, if the sensing result matches the preset user input, the sensor hub 4040 may activate the main processor 4050 and switch the portable device to the active mode or the voice service mode. A decision as to whether to switch the portable device to the active mode or the voice service mode may be made depending on whether the received sensing result matches a user input preset for switching to the active mode or a user input preset for switching to the voice service mode.

In an embodiment, a specific gesture for the portable device may be set as a voice service triggering gesture for entering the voice service mode. In this case, at least one of the motion sensor 4010 and the audio sensor 4020 may be placed in the active state to recognize the specific gesture and the sensor hub 4040 may determine whether a sensing result matches the voice service triggering gesture. If the sensing result matches the voice service triggering gesture, the sensor hub 4040 may activate the main processor 4050 so that the portable device may enter the voice service mode.

In accordance with the embodiment of FIG. 4, as the standby-mode portable device places the sensor hub 4040 in the active state and the main processor 4050 in the inactive state, it can reduce power consumption. Regarding the plurality of sensors, at least one sensor may be placed in the active state, while the other sensors in the inactive state, according to an input preset to wake up the portable device. Another embodiment for further reducing power consumption will be described below in the disclosure.

Figure 5:
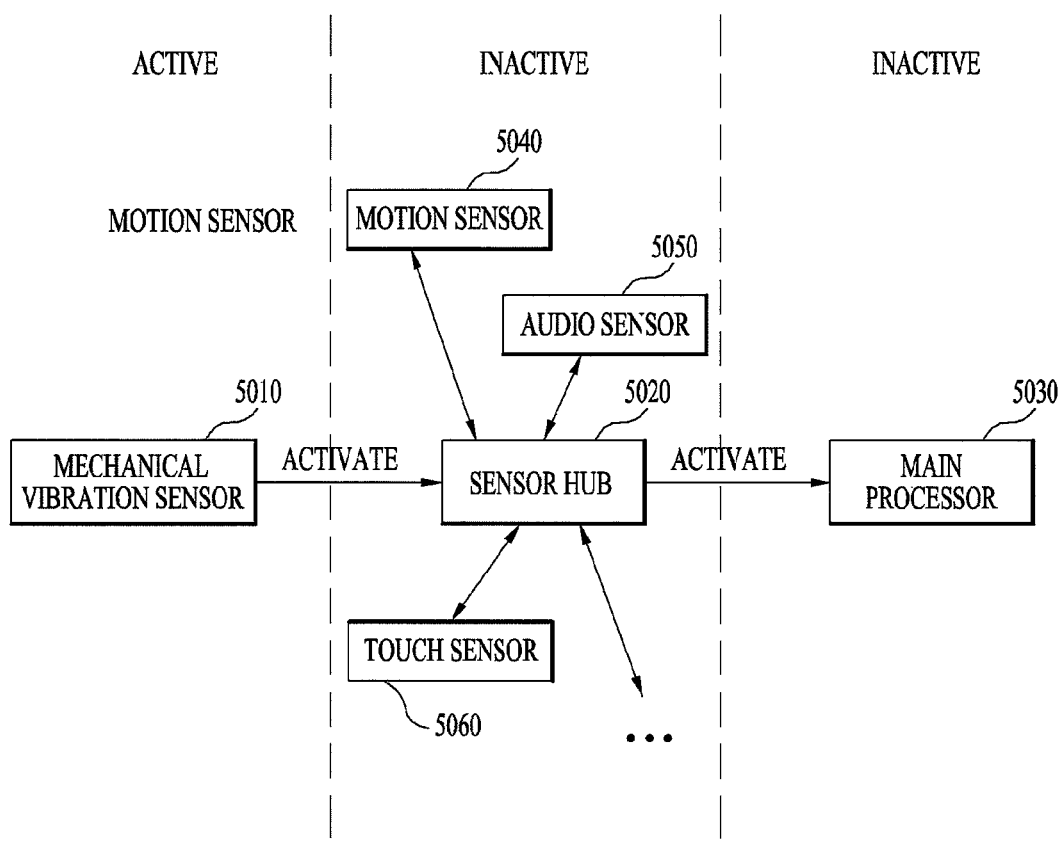
FIG. 5 illustrates a standby-mode portable device and a method for activating the standby-mode portable device according to an embodiment.

FIG. 5 illustrates a standby-mode portable device and a method for activating the standby-mode portable device according to an embodiment.

As in the embodiment of FIG. 4, the standby-mode portable device may maintain elements including a main processor 5030, a display unit, etc. in the inactive state. Compared to the portable device illustrated in FIG. 4, the portable device of FIG. 5 further includes a mechanical vibration sensor 5010.

In the standby-mode portable device of FIG. 5, only the mechanical vibration sensor 5010 is in the active state, while a sensor hub 5020, a plurality of sensors connected to the sensor hub 5020 (i.e. a motion sensor 5040, an audio sensor 5050, a touch sensor 5060, etc.), and the main processor 5030 are in the inactive state. When a motion at or above a threshold level is applied to the standby-mode portable device, the mechanical vibration sensor 5010 may sense the motion and transmit an electrical signal corresponding to the sensed motion to the sensor hub 5020. The electrical signal may activate the sensor hub 5020 and the activated sensor hub 5020 may in turn activate a necessary sensor and receive a sensing value to activate the main processor 5030. For example, the sensor hub 5020 may activate the motion sensor 5040 and determines whether a sensing result received from the motion sensor 5040 matches a voice service triggering gesture. If the sensing result matches the voice service triggering gesture, the sensor hub 5020 may activate the main processor 5040 so that the portable device may enter the voice service mode.

The sensor hub 5020 activated by the mechanical vibration sensor 5010 may activate an additional necessary sensor. If a sensing value received from the sensor activated by the sensor hub 5020 does not match a preset user input for activating the portable device, the sensor hub 5020 may deactivate the activated sensor and may return to the inactive state by deactivating itself.

Figure 6:
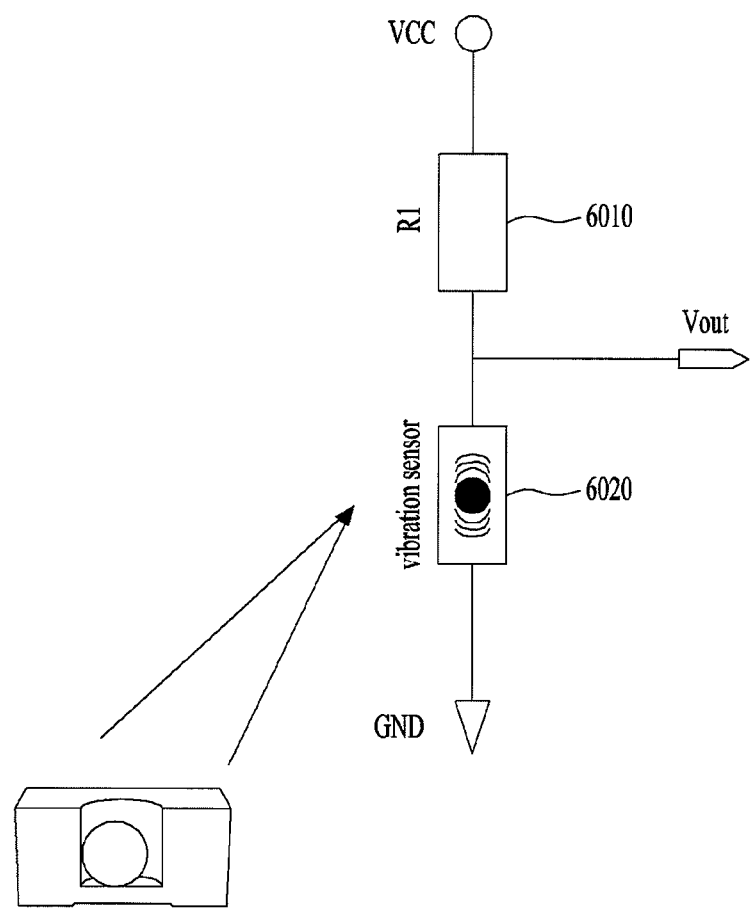
FIG. 6 illustrates a mechanical vibration sensor according to an embodiment.

FIG. 6 illustrates a mechanical vibration sensor according to an embodiment.

FIG. 6 illustrates an embodiment of a basic sensor circuit using a mechanical vibration sensor. The basic sensor circuit may have different configurations according to different embodiments. In an embodiment, a first resistor 6010 (R1) may be selected to limit maximum current flowing through the sensor to below 2 mA. The first resistor 6010 may be designed so as to have a resistance value exceeding 1 KOhm.

The mechanical vibration sensor 6020 may be called as a micro vibration sensor. In an embodiment, the mechanical vibration sensor 6020 may include micro ball (for example, mobile micro sphere) inside it. The ball bridges two contacts reducing the resistance between a plurality of external connection pads from mega Ohms (e.g. higher than 30 MOhm) to below 100 Ohms. When a motion occurs to the portable device, the ball inside of the mechanical vibration sensor 6020 may move and contact and thus the sensor circuit may generate an electrical signal and transmit it. The electrical signal may have an output voltage or output current of a predetermined magnitude or an output voltage pattern or an output current pattern. In other words, the mechanical vibration sensor 6020 may sense a motion applied to the portable device. If the strength of the motion, that is, the magnitude of the force of the motion is equal to or larger than a threshold level, the mechanical vibration sensor 6020 may output an electrical signal. The circuit diagram of FIG. 6 may differently designed with embodiments, and the mechanical vibration sensor and the circuit including the mechanical vibration sensor output an electrical signal corresponding to a motion sensed by the above-described mechanical vibration sensor. The electrical signal output from the mechanical vibration sensor may be an On/Off signal or a signal representing the strength of the sensed motion.

The mechanical vibration sensor is a fully passive device which can operate at a very low current level, 0.2 μA and the mechanical vibration sensor does not require signal conditioning. The mechanical vibration sensor or sensor circuit of FIG. 6 may be used as the mechanical vibration sensor of FIG. 5. In this case, an operation of the portable device will be described later.

Figure 7:
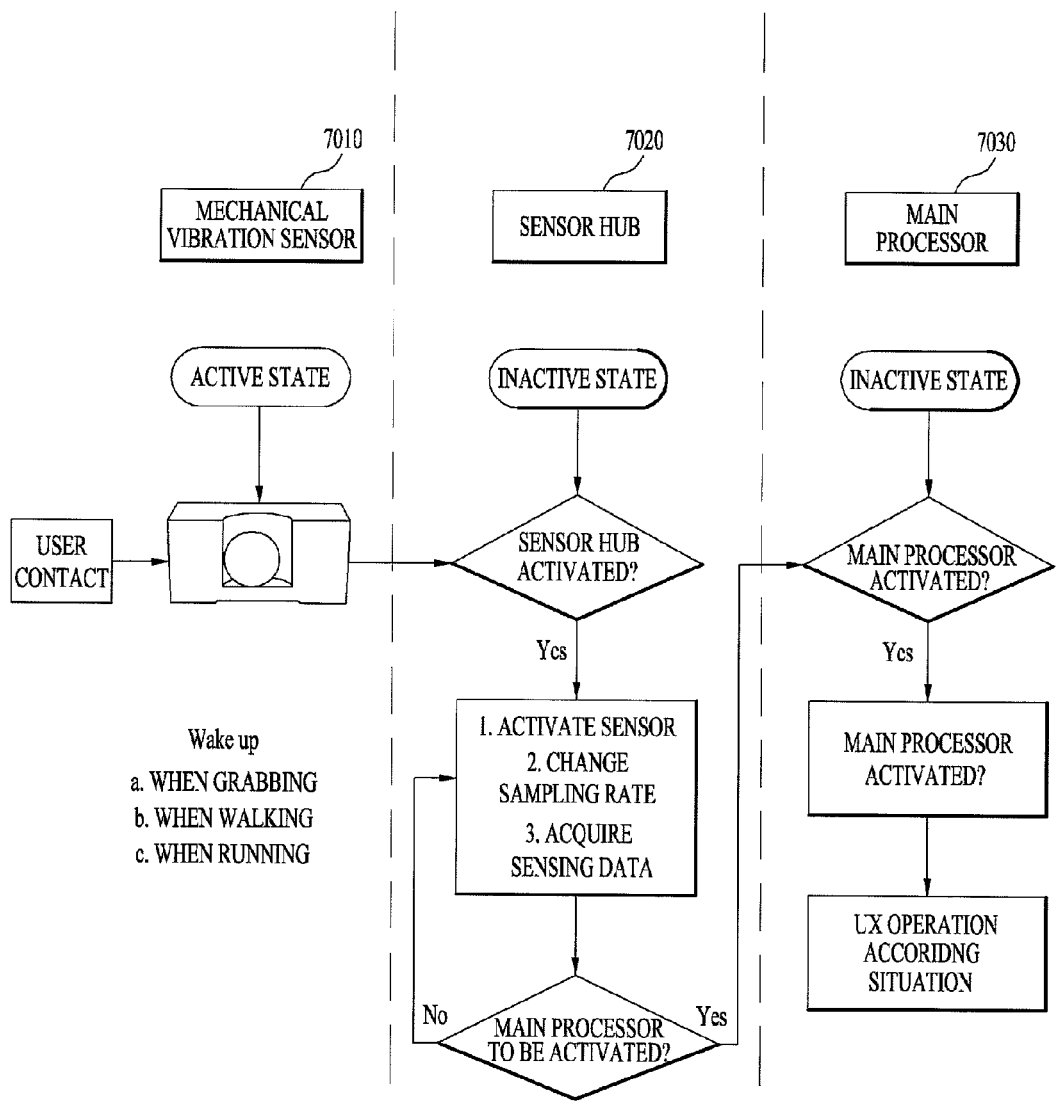
FIG. 7 illustrates a method for activating the portable device according to an embodiment.

FIG. 7 illustrates a method for activating the portable device according to an embodiment.

In addition to the descriptions of FIGS. 5 and 6, FIG. 7 depicts how to activate the standby-mode portable device.

In the standby-mode portable device, a sensor hub 7020 and a main processor 7030 are in the inactive state, while a mechanical vibration sensor 7010 is in the active state. The sensor hub 7020 may enter the active state by means of the mechanical vibration sensor 7010 and the main processor 7030 may enter the active state by means of the sensor hub 7020.

First of all, the mechanical vibration sensor 7010 may sense a user contact with the portable device. The user contact is a user input applied to use the voice service through activation of the portable device, corresponding to a voice service triggering gesture. If the magnitude of the force of the user contact, in other words, the strength of a motion that the user contact causes to the portable device is equal to or larger than a threshold level, the mechanical vibration sensor 7010 may output an electrical signal to the sensor hub 7020, thus activating the sensor hub 7020. A different threshold level may be set for strength of the motion leading to generation of an electrical signal from the mechanical vibration sensor 7010 depending on the context of the portable device. For example, when the user walks or runs, carrying the portable device, a motion with a certain strength level is continuously sensed. In this case, activation of the sensor hub 7020 each time brings about unnecessary power consumption. Therefore, the threshold level may be adjusted in the context of the user carrying the portable device, for example, the threshold may be increased.

Upon receipt of the electrical signal from the mechanical vibration sensor 7010, the sensor hub 7020 may enter the active state. Once the sensor hub 7020 is activated, the sensor hub 7020 may in turn activate at least one necessary sensor. For instance, the sensor hub 7020 may activate the motion sensor or the voice sensor. When needed, the sensor hub 7020 may adjust a sampling rate at which a sensing result is processed. When the sensor hub 7020 acquires sensing data from the activated sensor, the sensor hub 7020 may determine whether to activate the main processor 7030 based on the sensing data. For example, the sensor hub 7020 determines whether sensing data acquired through the motion sensor matches sensing data preset to activate the main processor 7030 and enter the voice service mode. If the acquired sensing data matches the preset sensing data, the sensor hub 7020 may activate the main processor 7030. The sensor hub 7020 may transmit an activate signal to activate the main processor 7030. A plurality of types of activate signals may be defined and an operation mode of the main processor 7030 may be determined according to an activate signal type. For example, if the sensor hub 7020 transmits a first activate signal, the main processor 7030 may enter the active mode. If the sensor hub 7020 transmits a second activate signal, the main processor 7030 may enter the voice service mode.

The main processor 7030 may enter the active state by means of the sensor hub 7020. In other words, the main processor 7030 may switch to the active state in response to the activate signal received from the sensor hub 7020. When the main processor 7030 is activated, it can enter an operation mode according to a situation of the portable device. The situation of the portable device may be known through the sensor activated by the sensor hub 7020 and may be indicated by an activate signal. For example, if the activate signal received from the sensor hub 7020 is a signal corresponding to the voice recognition service, the main processor 7030 may be activated and then enter the voice service mode by processing data needed to provide the voice recognition service. That is, in this case, the portable device switches from the standby mode to the voice service mode.

User contacts may correspond to various gestures. Because the mechanical vibration sensor 7010 can sense the motion strength of the portable device, when a force having a predetermined magnitude or above is applied to the portable device, the mechanical vibration sensor 7010 may transmit an electrical signal to the sensor hub 7020. The sensor hub 7020 may recognize various user inputs through its connected sensors. For example, the sensor hub 7020 may recognize at least one of a specific voice input, a specific touch input, and a specific gesture input and thus may activate the main processor 7030 according to the recognition result. In an embodiment, a user contact with the portable device may be used as a voice service triggering gesture.

If a user contact with the portable device is used as a voice service triggering gesture, the motion sensor may identify the user contact. In an embodiment, the user contact may be a gesture such as a knock on the portable device. For example, a gesture of tapping the portable device with a hand or a fingertip may be used as a voice service triggering gesture. This gesture will be referred to as a knock gesture.

The knock gesture may be identified by its gesture pattern. Specifically, the knock gesture may be sensed by the motion sensor in the portable device. The motion sensor may identify the knock gesture by sensing the pattern of the knock gesture, that is, the vibration pattern of the knock gesture. In the disclosure, the motion sensor is a sensor that measures a motion of the portable device and provides the measurement result to the sensor hub. In an embodiment, the motion sensor may measure the motion of the portable device using one or more of the geomagnetic sensor, the acceleration sensor, and the gyro sensor. A knock gesture measured by the motion sensor corresponds to a vibration pattern of the portable device. The vibration pattern has at least one vibration at a peak and is identified by the magnitude of the at least one peak vibration and the interval between a plurality of vibrations.

Figure 8:
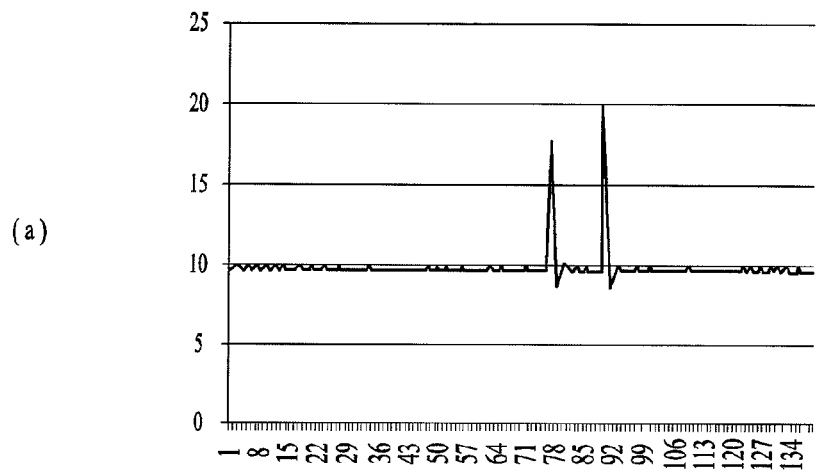
FIG. 8 illustrates results of sensing a voice recognition service triggering gesture in the portable device according to embodiments.
Figure 8:
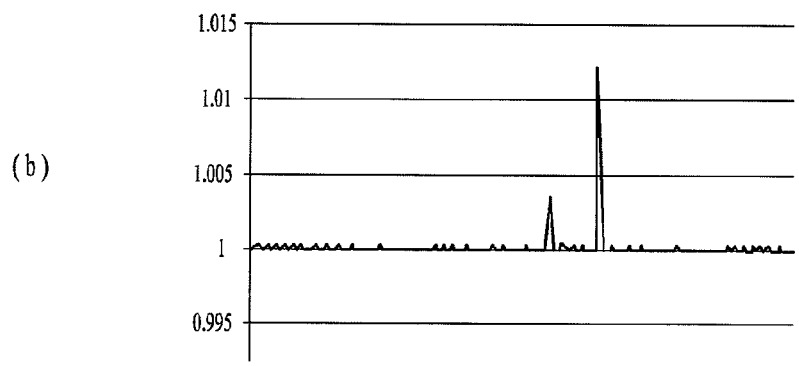
Figure 8:
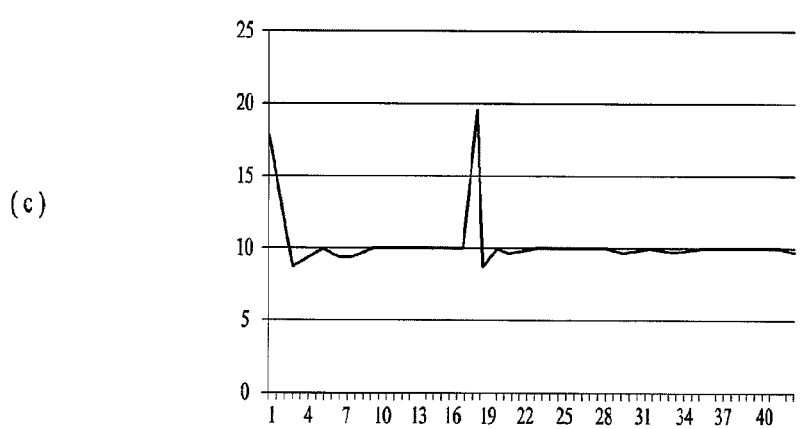

FIG. 8 illustrates results of sensing a voice service triggering gesture in the portable device according to embodiments.

Like the above-described knock gesture, a gesture of imparting a force with a predetermined magnitude or above to the portable device a plurality of times may be defined as a voice service triggering gesture. The motion sensor may sense this voice service triggering gesture and get a sensing result as illustrated in FIG. 8. The sensing result may correspond to the result of sensing a contact with the portable device or vibrations of the portable device in at least one of the acceleration sensor and the gyro sensor. Specifically, the sensing result corresponds to a waveform being the root of the sum of squared sensing results of the acceleration sensor and the gyro sensor with respect to X, Y and Z axes. The horizontal axis represents time and the vertical axis represents vibration strength in units of gravity acceleration in the graphs illustrated in FIG. 8.

If the voice service triggering gesture is composed of two contacts, the motion sensor senses a vibration pattern as illustrated in FIG. 8(a). It is noted from FIG. 8(a) that the vibration waveform balanced at 9.8 m/s$^2$ being a reference point of 1G reaches almost 20 m/s$^2$ at two peaks due to a knock gesture. That is, the motion sensor of the portable device senses the knock gesture that has generated two vibrations at two peaks. The knock gesture may be identified by vibrations at peaks and the interval between the vibrations, as illustrated in FIG. 8(a). That is, the portable device may identify the pattern of vibrations sensed by the motion sensor and determine whether to enter the voice service mode or return to the standby mode depending on whether the identified vibration pattern matches the voice service triggering gesture. The knock gesture is sensed as a vibration pattern and thus identified by the vibration pattern.

In the above-described embodiments, the portable device may use a mechanical vibration sensor. In this case, the mechanical vibration sensor may sense the first vibration of a knock gesture and activate the sensor hub and the motion sensor. Thus the motion sensor may sense the gesture. In other words, a time delay may be involved in sensing the first vibration of the knock gesture at the mechanical vibration sensor, activating the motion sensor by the mechanical vibration sensor, and sensing the knock gesture by the motion sensor. The time delay may vary depending on the performance and driving speed of the sensors and the design of the circuit. If almost no time delay occurs or a time delay is negligibly small, the waveform illustrated in FIG. 8(a) may be sensed. On the contrary, waveforms illustrated in FIGS. 8(b) and 8(c) may be sensed, according to the time delay.

As described before, upon sensing a vibration having a predetermined magnitude or above, the mechanical vibration sensor transmits an electrical signal to the sensor hub, thus activating the sensor hub. The sensor hub may activate necessary sensors and collect context information from the activated sensors. In an embodiment, the vibration pattern of a knock gesture sensed by the motion sensor may vary depending on a vibration threshold level based on which the mechanical sensor activates the sensor hub and a delay time after which the motion sensor is activated.

If the vibration threshold level is low and almost no time delay occurs, the motion sensor may sense a knock gesture having the waveform illustrated in FIG. 8(a). The sensor hub may determine whether the sensed waveform matches a voice recognition triggering gesture based on at least one of a vibration magnitude and the interval between vibrations in the waveform illustrated in FIG. 8(a). However, the knock gesture may be sensed as having the waveform illustrated in FIG. 8(b) or FIG. 8(c) according to the vibration threshold level and the time delay.

FIG. 8(b) illustrates a waveform created by lowering a sensing criterion to identify a knock gesture. The vertical axis is represented with 9.8 m/s$^2$ changed as the reference point of 1G. In FIG. 8(b), although the motion sensor may not fully sense the first vibration of a knock gesture due to a time delay, it may sense a part (the remaining part) of the first vibration and the second vibration of the knock gesture. That is, the portable device may set a vibration pattern recognized as a knock gesture to that illustrated in FIG. 8(*b*), taking into account the threshold level set for the mechanical vibration sensor and a time delay.

FIG. 8(*c*) illustrates a sensed vibration waveform in the case where the motion sensor senses a latter part of the first vibration and the full second vibration in view of a time delay. In FIG. 8(*c*), the motion sensor may identify a knock gesture based on a vibration magnitude and the interval between vibrations in the vibration pattern sensed by it after the sensor hub is activated.

FIG. 8 illustrates embodiments in which the portable device may identify a knock gesture according to its performance, the performance of elements included in the portable device, a device design, or a setting. In an embodiment, a knock gesture is defined as two vibrations. The knock gesture is identified by the two vibrations at or above predetermined peak levels and, in addition, the time interval between the two vibrations. However, the knock gesture, that is, the voice service triggering gesture may be set to have more vibrations, a different vibration magnitude, and a different time interval in many other manners than in the above embodiments.

Figure 9:
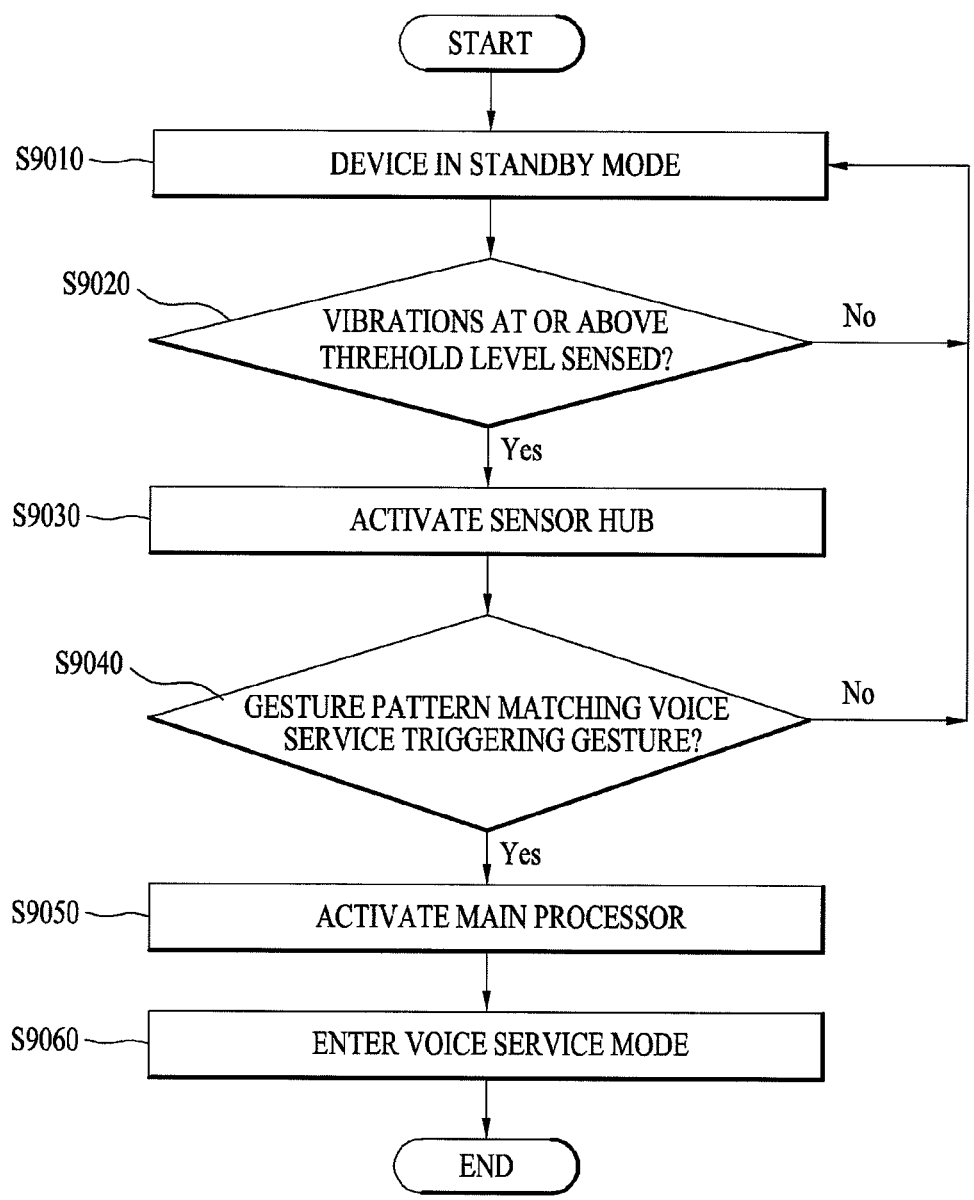
FIG. 9 is a flowchart illustrating a method for providing a voice recognition service in the standby-mode portable device according to an embodiment.

FIG. 9 is a flowchart illustrating a method for providing the voice recognition service in the standby-mode portable device according to an embodiment.

Referring to FIG. 9, the portable device is placed in the standby mode (S9010). The standby-mode portable device sets the mechanical vibration sensor to the active state and the sensor hub and the main processor to the inactive state, as described before with reference to FIGS. 5 to 8.

Upon sensing a vibration at or above a threshold level (S9020), the mechanical vibration sensor activates the sensor hub (S9030). When sensing a motion having a strength equal to or larger than a threshold, the mechanical vibration sensor may transmit an electrical signal to the sensor hub, thereby activating the sensor hub. The step of activating the sensor hub may include activating at least one necessary sensor. In an embodiment, the sensor hub may activate the motion sensor.

The sensor hub may determine whether a gesture pattern sensed through the activated motion sensor matches a voice service triggering gesture (S9040). As described before, the sensor hub may compare the vibration pattern of the knock gesture sensed through the motion sensor with a pre-stored pattern of the voice service triggering gesture and may determine whether to enter the voice service mode depending on whether the two patterns match.

If the sensed gesture pattern matches the voice service triggering gesture (S9040), the sensor hub may activate the main processor (S9050) and may enter into the voice service mode (S9060).

Figure 10:
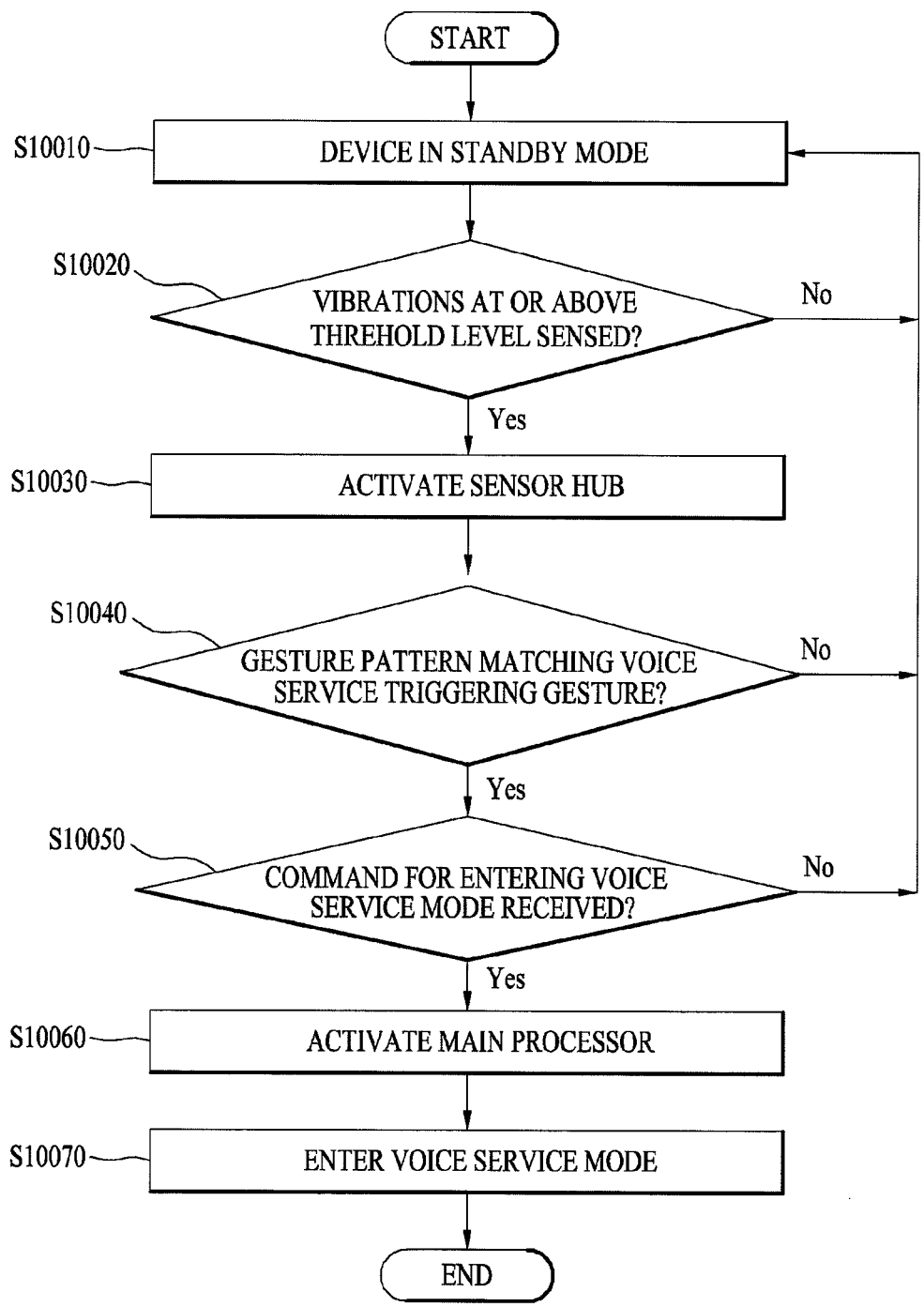
FIG. 10 is a flowchart illustrating a method for providing the voice recognition service in the standby-mode portable device according to another embodiment.

FIG. 10 is a flowchart illustrating a method for providing the voice recognition service in the standby-mode portable device according to another embodiment.

The same steps as illustrated in FIG. 9 will be described briefly or will not be described herein. Referring to FIG. 10, the portable device is in the standby mode (S10010). As done in FIG. 9, when the mechanical vibration sensor senses a vibration having a strength equal to or larger than a threshold (S10020), the mechanical vibration sensor may activate the sensor hub (S10030) and the activated sensor hub may in turn activate a necessary sensor.

The sensor hub may determine whether a gesture pattern sensed through the activated motion sensor matches a voice service triggering gesture (S10040). As described before, the sensor hub may compare the vibration pattern of the knock gesture sensed through the motion sensor with a pre-stored pattern of the voice service triggering gesture and may determine whether to enter the voice service mode depending on whether the two patterns match. As described before with reference to FIG. 8, the vibration pattern may include a plurality of vibrations having at least one peak and may be identified by at least one of the magnitudes of the plurality of vibrations and the interval between the vibrations. The sensor hub may identify the vibration pattern of the knock gesture sensed by the motion sensor and may determine whether a part of the first vibration and at least one vibration after the first vibration in the vibration pattern match the voice service triggering gesture.

If switching from the standby mode to another mode is determined simply based on a gesture, an error may occur. Although a different gesture may be set to overcome this problem, a voice command may be additionally received, for determining whether to implement the voice recognition service. That is, if a gesture pattern sensed by the portable device matches the voice service triggering gesture, the portable device may enter the voice service mode only when receiving an additional command requesting entry into the voice service mode, without directly entering the voice service mode as done in FIG. 9.

The command requesting entry into the voice service mode may be called shortly 'a voice service invoking command'. In an embodiment, if the gesture pattern matches the voice service triggering gesture, the sensor hub may activate the audio sensor. Upon receipt of voice from the user, the sensor hub determines whether the user voice corresponds to the voice service invoking command (S10050). If the user voice corresponds to the voice service invoking command, the sensor hub may activate the main processor (S10060) and may enter the voice service mode (S10070). On the contrary, if the user voice does not correspond to the voice service invoking command, the sensor hub may return to the standby mode.

Unlike the operation of FIG. 10, it may be further contemplated as another embodiment that the main processor receives and processes a voice service invoking command instead of the sensor hub. That is, the main processor may be activated and determine whether a received user voice corresponds to the voice service invoking command. In this case, the order of steps S10050 and S10060 may be reversed.

The sensor hub may determine whether the received voice service invoking command matches a pre-stored voice service invoking command. In an embodiment, the voice service invoking command may be composed of specific words, for example, 'Q Voice'. The sensor hub may analyze the user voice received through the audio sensor and determine whether the received user voice corresponds to the voice service invoking command. For example, if the received user voice corresponds to 'Q Voice', the sensor hub may enter the voice service mode by activating the main processor.

The sensor hub may use different sampling rates when analyzing a gesture pattern sensed by the motion sensor and when analyzing a voice command received through the audio sensor. In an embodiment, the sensor hub may adjust each of the sampling rates. For example, the sensor hub may set the sampling rate higher in step S10050 than in step S10040. This is because fine sampling of data may be more significant to voice recognition than to gesture recognition. When the audio sensor is used, the sensor hub may adjust, that is, increase or decrease the sampling rate of sensing data.

If the sensed gesture pattern matches the voice service triggering gesture (S10040) and the voice service invoking command is received (S10050), the sensor hub may activate the main processor (S10060) and may enter the voice recognition service mode (S10070).

Now the methods for providing the voice recognition service in the standby-mode portable device will further be described on a step basis.

Figure 11:
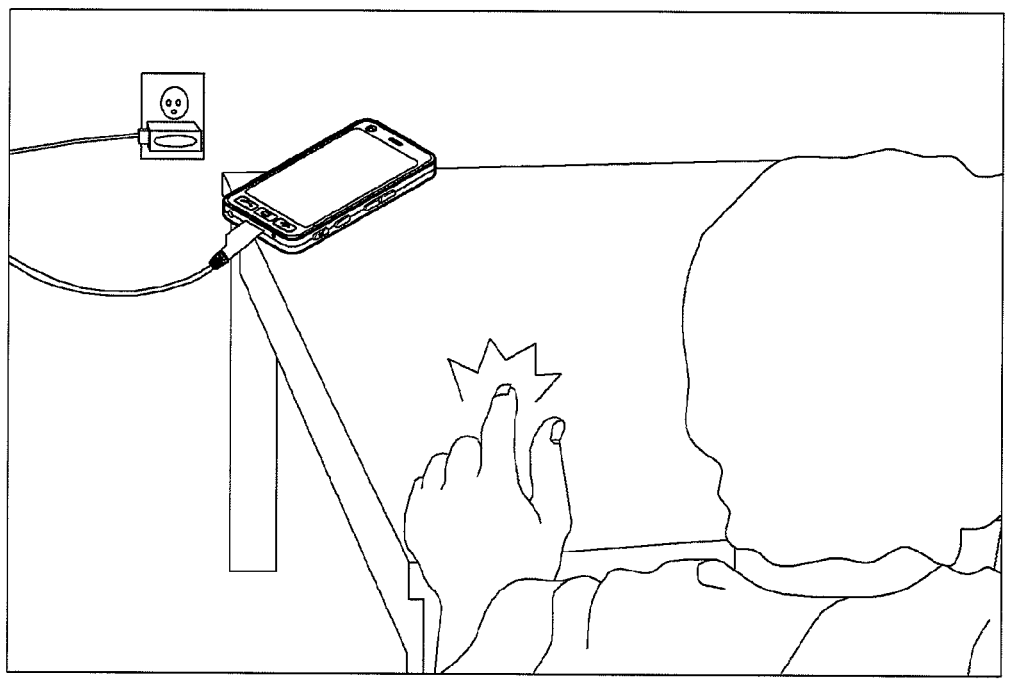
FIG. 11 illustrates a scene of performing a method for providing the voice recognition service in the standby-mode portable device according to an embodiment.

FIG. 11 illustrates a scene of performing a method for providing the voice recognition service in the standby-mode portable device according to an embodiment.

Referring to FIG. 11, the portable device is in the standby mode, placed on a table. As illustrated in FIG. 11, the user may tap the table with his or her finger tip. In an embodiment, the user may tap the portable device. Since the portable device identifies a knock gesture by the pattern of its vibrations, any type of gesture that can generate vibrations to the portable device may be a knock gesture in an embodiment. As in the embodiment of FIG. 3, the mechanical vibration sensor may activate the sensor hub and the motion sensor. Then the sensor hub and the motion sensor may sense the knock gesture and thus it may be determined whether the knock gesture matches a voice service triggering gesture.

In an embodiment, while the portable device is being charged, the portable device may be placed in the active mode because of a less concern about power consumption. Or the portable device may be placed in the standby mode as illustrated in FIG. 4. In this case, the portable device may turn on the audio sensor and may recognize a knock gesture through the audio sensor. In other words, the knock gesture may be identified by 'tap, tap' sound of the knock gesture. Or the knock gesture may be identified by its sound and vibrations through both the motion sensor and the audio sensor.

Figure 12:
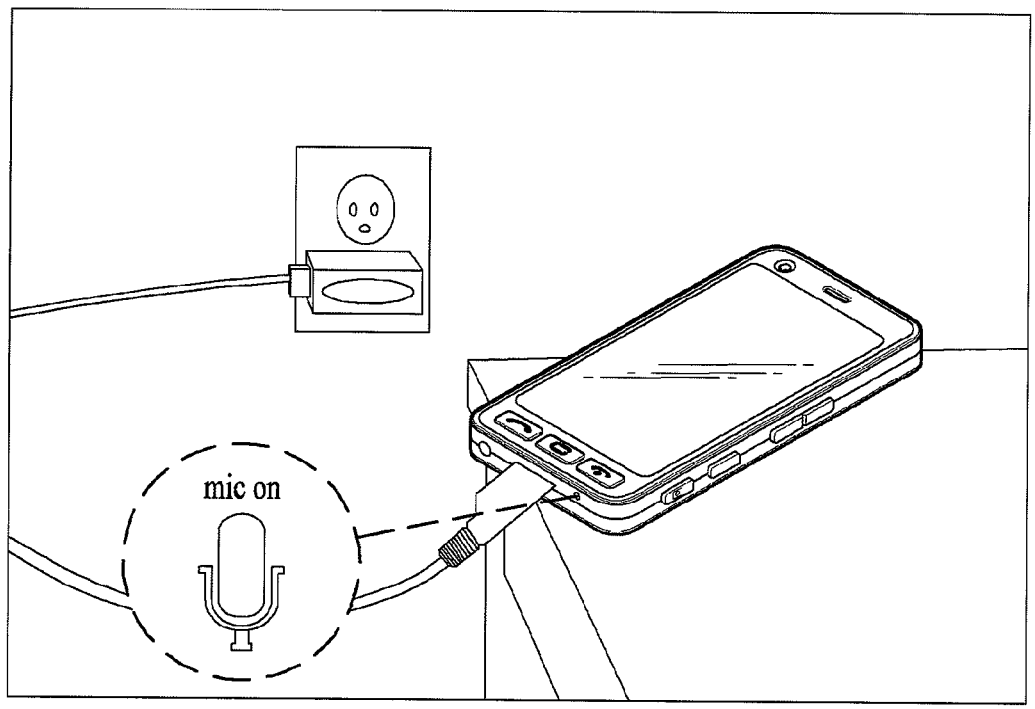
FIG. 12 illustrates another scene of performing a method for providing the voice recognition service in the standby-mode portable device according to an embodiment.

FIG. 12 illustrates another scene of performing a method for providing the voice recognition service in the standby-mode portable device according to an embodiment.

Referring to FIG. 12, the portable device is in waiting state, with the audio sensor turned on (mic on). If a knock gesture matches a voice service triggering gesture, the portable device may enter the voice service mode or may await receipt of a voice service invoking command. In the illustrated case of FIG. 12, the user-input gesture of FIG. 11 matches the voice service triggering gesture.

The portable device may provide a feedback indicating match between the knock gesture and the voice service triggering gesture to the user. Or the portable device may provide a feedback asking whether to enter the voice service mode to the user. This feedback may be at least one of a visual feedback, an audio feedback, and a tactile feedback. Particularly when the display unit is placed in the inactive state in the voice service mode, the feedback may be needed. The feedback may be provided in various manners. In an embodiment, the feedback may be provided in various manners, including flickering of a Light Emitting Diode (LED) lamp, a visual indication indicating entry into the voice service mode, emission of a specific sound, output of a voice message such as "Voice recognition service launched", or generation of vibrations.

In FIG. 12, the portable device may be in a state where it awaits receipt of the voice service invoking command before entering the voice service mode (between steps S10040 and S10050 in FIG. 10) or awaits receipt of a user command after entering the voice service mode.

Figure 13:
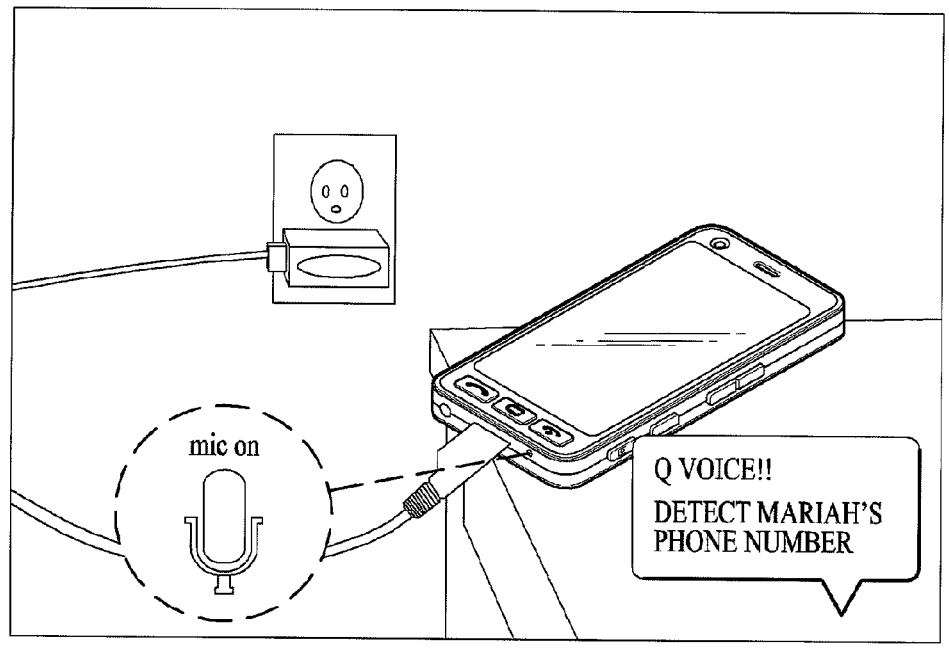
FIG. 13 illustrates another scene of performing a method for providing the voice recognition service in the standby-mode portable device according to an embodiment.

FIG. 13 illustrates another scene of performing a method for providing the voice recognition service in the standby-mode portable device according to an embodiment.

In FIG. 13, the portable device receives a voice command. "Q voice" may be a voice service invoking command and 'detect Mariah's phone number' may be a voice recognition service command requesting search for a phone number.

Upon receipt of the voice 'Q voice', the portable device may determine whether the received voice is the voice service invoking command. As described before, the sensor hub or the main processor may make the determination. If the sensor makes the determination and the voice 'Q voice' is the voice service invoking command, the sensor hub sets the main processor to the active state and enters the voice service mode. Then the portable device may recognize and process the user voice 'detect Mariah's phone number' in the voice service mode.

Figure 14:
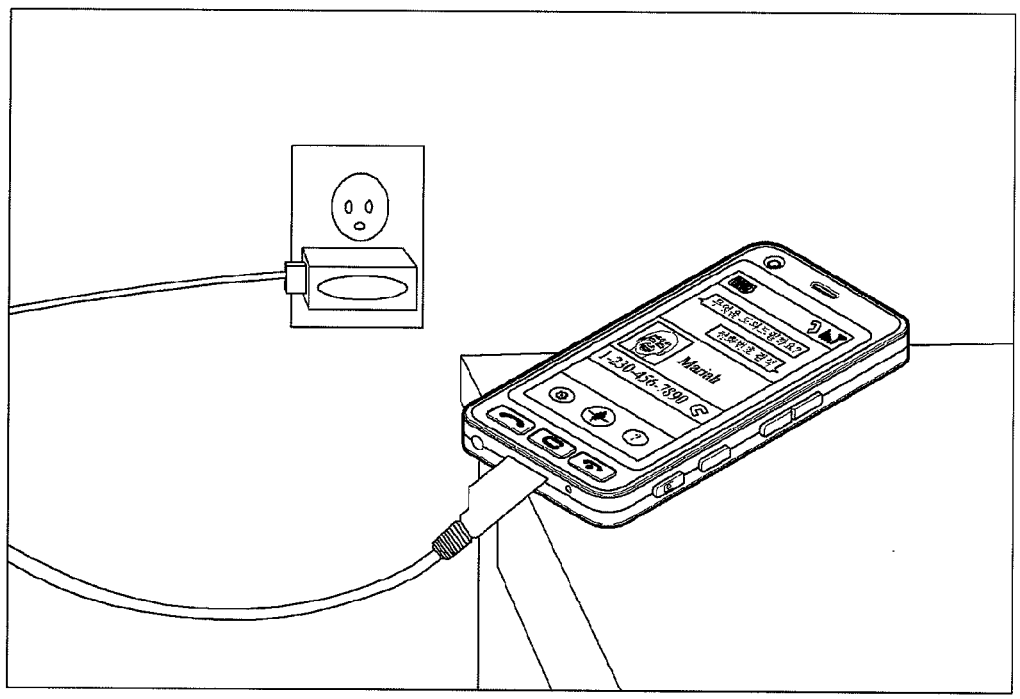
FIG. 14 illustrates a further scene of performing a method for providing the voice recognition service in the standby-mode portable device according to an embodiment.

FIG. 14 illustrates a further scene of performing a method for providing the voice recognition service in the standby-mode portable device according to an embodiment.

In FIG. 14, the portable device performs an operation according to a user's voice command and provides the result of the operation in the voice service mode. In the embodiment of FIG. 14, the result of processing the voice command is provided to the display unit. The processing result may be provided to the user by voice or in many other ways according to embodiments.

The portable device executes the received user's voice command (detect Mariah's phone number) of FIG. 13 and provides the execution result (i.e. the phone number of Mariah) to the display unit. Or the portable device may provide the execution result of the voice command to the user by voice.

As is apparent from the above description, when switching from standby mode to active mode, a portable device according to an embodiment can reduce standby power consumption in the standby mode remarkably by means of a mechanical vibration sensor. Since the portable device can directly enter voice recognition service mode from the standby mode in response to a preset gesture, it can provide a user-intended service without passing through active mode. In addition, as the portable device operates in the separately defined voice recognition service mode, it can provide the voice recognition service with lower power than in the active mode. Further, the portable device can provide the voice recognition service directly, waking up from the standby mode in response to a user's intuitive gesture. In this case, power consumption can also be reduced.

It will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

What is claimed is:

1. A portable device comprising:
   sensors configured to sense user inputs;
   a sensor hub configured to activate a main processor and control the sensors including a touch sensor, the touch sensor sensing touch inputs while the portable device is in a standby mode; and
   the main processor configured to execute an application and control the portable device,
   wherein, when the portable device is in the standby mode, the touch sensor is in an active state and at least one of the sensors except the touch sensor is in an inactive state, and
   wherein, when the touch sensor detects a first touch input which corresponds to a pre-stored pattern, the sensor hub determines whether the portable device is switched to a first active mode or a second active mode according to the pre-stored pattern and activates the main processor of the portable device, and the portable device is switched to the first active mode or the second active mode based on the determination of the sensor hub.

2. The portable device according to claim 1, wherein the first touch input is a knock gesture to the portable device.

3. The portable device according to claim 1, wherein when the portable device is switched from the standby mode to the first active mode or the second active mode, the at least one of the sensors is switched to the active state.

4. The portable device according to claim 1, wherein when the portable device is in the standby mode, the main processor is in the inactive state and the sensor hub is in the active state.

5. The portable device according to claim 1, wherein the portable device further comprises a display unit.

6. The portable device according to claim 5, wherein when the portable device enters the first active mode or the second active mode, the display unit is configured to provide a feedback indicating that the portable device is entered into the first active mode or the second active mode.

7. The portable device according to claim 1, wherein when the touch sensor detects a second touch input which does not correspond to the pre-stored pattern, the sensor hub does not activate the main processor and maintain the portable device in the standby mode.

8. The portable device according to claim 1, wherein when the touch sensor detects the first touch input, the sensor hub determines whether the first touch input corresponds to the pre-stored pattern to activate the main processor.

9. The portable device according to claim 1, wherein the sensors include at least two of a gravity sensor, a geomagnetic sensor, a gyro sensor, an acceleration sensor, an inclination sensor, an illuminance sensor, an altitude sensor, an odor sensor, a temperature sensor, a depth sensor, a pressure sensor, a bending sensor, an audio sensor, a video sensor, a Global Positioning System (GPS) sensor, the touch sensor and a mechanical vibration sensor.

10. The portable device according to claim 1, wherein the sensor hub is connected to entire of the sensors.

11. A method of controlling a portable device comprising:
activating a touch sensor when the portable device is in a standby mode, wherein the portable device includes sensors and at least one of the sensors except the touch sensor is in an inactive state;
detecting, through the touch sensor, a first touch input;
determining, through a sensor hub, whether the first touch input corresponds to a pre-stored pattern to activate a main processor, wherein the sensor hub further determines whether the portable device is switched to a first active mode or a second active mode according to the pre-stored pattern;
activating, through a sensor hub, the main processor when the first touch input corresponds to the pre-stored pattern; and
switching the portable device from the standby mode to the first active mode or the second active mode based on the determination of the sensor hub.

12. The method according to claim 11, wherein the first touch input is a knock gesture to the portable device.

13. The method according to claim 11, wherein when the portable device is switched from the standby mode to the first active mode or the second active mode, the at least one of the sensors is switched to the active state.

14. The method according to claim 11, wherein when the portable device is in the standby mode, the main processor is in the inactive state and the sensor hub is in the active state.

15. The method according to claim 11, wherein the portable device further comprises a display unit.

16. The method according to claim 15, wherein when the portable device enters the first active mode or the second active mode, the display unit is configured to provide a feedback indicating that the portable device is entered into the first active mode or the second active mode.

17. The method according to claim 11, wherein when the touch sensor detects a second touch input which does not correspond to the pre-stored pattern, the sensor hub does not activate the main processor and maintain the portable device in the standby mode.

18. The method according to claim 11, wherein when the touch sensor detects the first touch input, the sensor hub determines whether the first touch input corresponds to the pre-stored pattern to activate the main processor.

19. The method according to claim 11, wherein the sensors include at least two of a gravity sensor, a geomagnetic sensor, a gyro sensor, an acceleration sensor, an inclination sensor, an illuminance sensor, an altitude sensor, an odor sensor, a temperature sensor, a depth sensor, a pressure sensor, a bending sensor, an audio sensor, a video sensor, a Global Positioning System (GPS) sensor, the touch sensor and a mechanical vibration sensor.

20. The method according to claim 11, wherein the sensor hub is connected to entire of the sensors.

\* \* \* \* \*

UNITED STATES PATENT AND TRADEMARK OFFICE
CERTIFICATE OF CORRECTION

| | | |
|---|---|---|
| PATENT NO. | : 8,904,218 B2 | Page 1 of 1 |
| APPLICATION NO. | : 14/203119 | |
| DATED | : December 2, 2014 | |
| INVENTOR(S) | : Hokyung Ka et al. | |

It is certified that error appears in the above-identified patent and that said Letters Patent is hereby corrected as shown below:

ON THE TITLE PAGE:

Item (12) should read Ka, et al.

At Item (72), Inventors, change:

"Kiwon Lee, Seoul (KR); Suyoung Lee, Seoul (KR); Hokyuong Ka, Seoul (KR); Youngwoo Kim, Seoul (KR)"

to:

--Hokyung Ka, Seoul (KR); Youngwoo Kim, Seoul (KR); Suyoung Lee, Seoul (KR); Kiwon Lee, Seoul (KR)--.

Signed and Sealed this
Fourteenth Day of April, 2015

Michelle K. Lee
*Director of the United States Patent and Trademark Office*